United States Patent [19]
Scharer

[11] 3,850,414
[45] Nov. 26, 1974

[54] HOMOGENIZING EXTRUDERS

[76] Inventor: Hans R. Scharer, Wallingford, Conn.

[22] Filed: Dec. 26, 1972

[21] Appl. No.: 318,679

[52] U.S. Cl. ............................................. 259/191
[51] Int. Cl. ......................... B01f 7/02, B01f 7/08
[58] Field of Search ......... 259/191, 192, 193, 9, 10, 259/109, 110, 25, 26, 45, 46; 425/200, 209

[56] References Cited
UNITED STATES PATENTS

| | | | |
|---|---|---|---|
| 3,115,674 | 12/1963 | Schrenk | 259/191 |
| 3,271,819 | 9/1966 | Lacher | 259/191 |
| 3,300,810 | 1/1967 | Gregory | 259/191 |
| 3,687,423 | 8/1972 | Koch | 259/9 |
| 3,721,427 | 3/1973 | Upmeier | 259/191 |

*Primary Examiner*—Robert W. Jenkins
*Attorney, Agent, or Firm*—Howard R. Berkenstock, Jr. et al.

[57] ABSTRACT

An extruder for processing thermoplastic materials such as low density polyethylene incorporating a body having a bore therethrough with a rotor having several mixing and cooling sections set thereon in succession to intensively mix the thermoplastic materials without exceeding permissible temperatures. The mixing sections are multiple flighted with alternating primary and secondary flights defining primary and secondary channels having their discharge and entrances respectively blocked or restricted. This configuration forces material to flow into the primary channel and be subjected to high shearing forces at it is forced or extruded over the secondary flight into the secondary channel as the material traverses the mixing section. The cooling or pumping section is a multiple flighted screw, each flight having a uniform periphery to effectively scrape the extruder bore walls to minimize polymer film heat transfer resistance.

8 Claims, 5 Drawing Figures

HOMOGENIZING EXTRUDERS

BACKGROUND OF THE INVENTION

In the manufacture of low density polyethylene it has been found that mechanical shearing of the molten material improves the optical and sometimes the physical properties. Also, various additives such as processing aids, stabilizers, and color additives may preferably be added to the material. Historically, this mechanical shearing has been done in intensive mixers or in cold feed extruders by remelting material through the application of mechanical shear forces. Since the material is originally produced as a hot molten liquid, this remelting process involves intermediate pelletizing, cooling and drying steps in the originally produced material. It is an object of the present invention to eliminate the intermediate processing steps and perform mechanical shearing and mixing-in of additives in the extruder which is fed directly from a reactor which produces the polyethylene.

Various attempts have been made in the past to increase the amount of work put into thermoplastic material in extruders by virtue of adding various devices or sections in an extruder. Illustrative are the sections illustrated in U. S. Pat. Nos. 2,607,077 and 2,453,088 to Dulmage. However, these devices do not insure that the flow path of the material through the shear zones is completely controlled or known. These devices exhibit the characteristics that the plastic material being forced through the shear zones follows a random flow by virtue of some of it being sheared over the top of the screw flights an indeterminate number of times while other portions of the material may flow through the channels without ever being subjected to the shearing actions of extrusion over the screw flights.

Since low density polyethylene is susceptible to degradation if exposed to excessively high temperatures, past attempts to provide controlled work input devices have, of necessity, limited the overall length of the devices so as to keep all of the work material within the acceptable temperature ranges.

An alternative apparatus for producing low density polyethylene is illustrated in U. S. Pat. No. 3,146,493 to Steinle et al. This device is commonly known as a Twin Screw Extruder. This particular style of apparatus, while effective for certain particular types of materials, does not provide the flexibility of operation required of modern plastics processing plants. Twin screw extruders act as positive displacement pumps. Thus, the through put of the extruder is directly proportional to the screw speed. With the through put thus dependent upon the screw speed, control of the specific energy input to the material is dependent upon the amount of cooling which may be applied to the machine, unless the particular mechanical construction or geometry of the screw is changed.

Twin screw extruders are complex devices and have a high initial cost. They also require a regular continuing maintenance. Imposed upon these requirements is the additional requirement of maintaining an inventory of a variety of screws of different geometry to accomplish a degree of control over specific energy inputs into the processed material. Such requirements render the utilization of twin screw extruder devices uneconomical for present day application.

SUMMARY OF THE INVENTION

The present invention relates to an extruder for working thermoplastic material, such as low density polyethylene, to improve the physical properties thereof. As certain features of the invention, an illustrative extruder includes a body having a longitudinal bore therethrough. Disposed at either ends of the bore and communicating therewith are openings for the feeding and discharging of material worked therein. Disposed within the bore and adapted for rotary movement is a rotor having thereon a plurality of helical thread convolutions forming flights to effect the movement and working of the material traversing the extruder. The extruder, between the feed opening and discharge opening, includes a plurality of functional sections for mixing the material and for pumping the material through the extruder. In the pumping section the rotor includes a plurality of n (where n is any integer) thread convolutions, adjacent convolutions of which form channels therebetween for conveying the thermoplastic material along the bore. In said mixing sections the rotor is adapted with a plurality of 2n thread convolutions alternately denoted primary and secondary convolutions and defining therebetween primary and secondary channels. The primary convolutions are continuations of the thread convolutions of the pumping sections and the secondary convolutions are disposed therebetween. The pumping sections advance material to a subsequent mixing section primary channel which in turn extrudes the material into an adjacent secondary channel and into the subsequent pumping section. The structure of the inventive extruder thus subjects the traversing thermoplastic material to a predetermined flow path and a determinable amount of working.

DESCRIPTION OF THE PREFERRED EMBODIMENT

Figure 1:
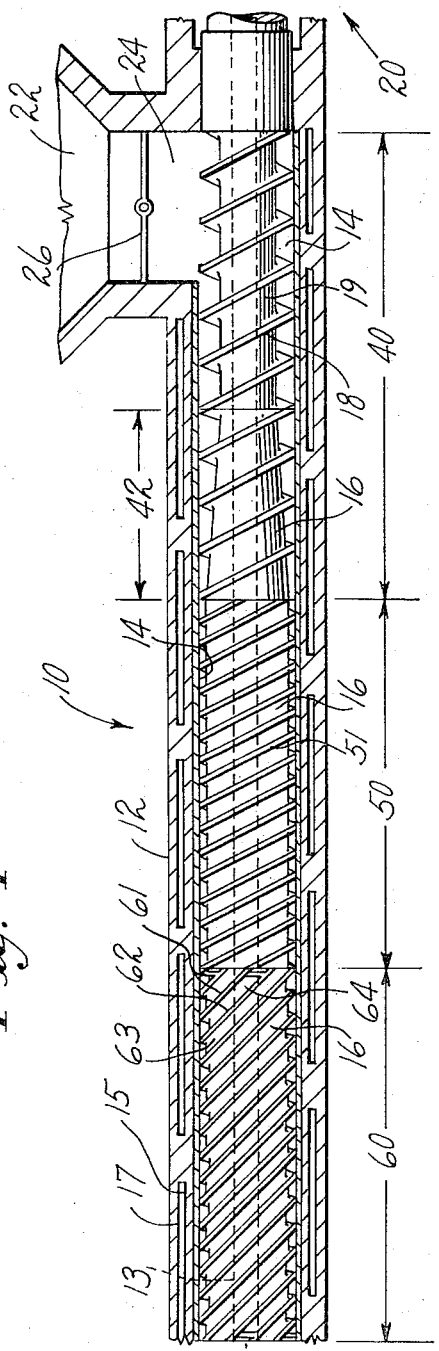
FIG. 1 is an elevational view, partially in section, of an extruder illustrative of the invention.
Figure 1:
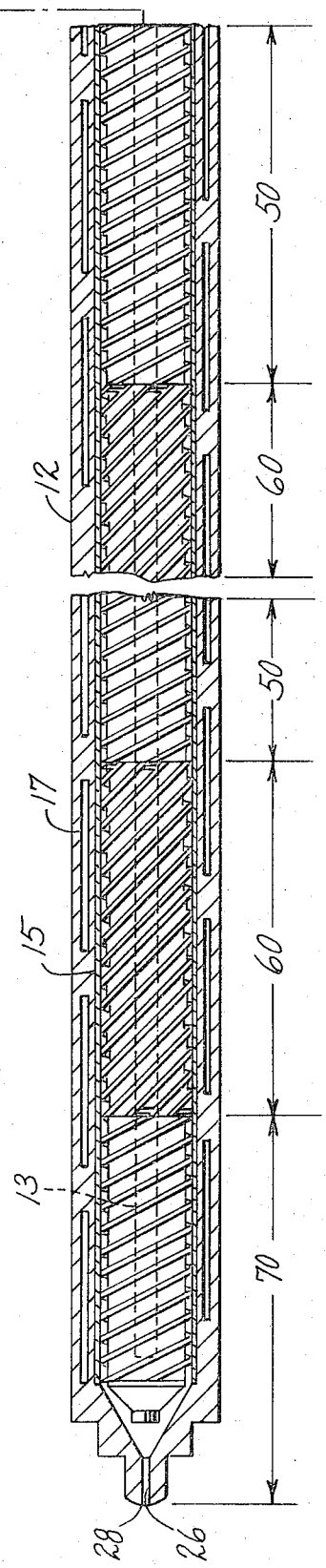

Referring now to the drawings, reference numeral 10 indicates an extruder illustrative of the invention. Extruder 10 includes a main body portion 12 having a bore 14 extending longitudinally therein. Within bore 14 is a rotor 16 disposed for rotary movement. In the illustrated embodiment the extruder barrel 12 is of a special, thin-walled design as indicated at 15, having high velocity, heat transfer flow means disposed therein as circulating means 17. Circulating means 17 is disposed adjacent the bore wall at 15 to maximize the heat transfer. Also, as illustrated, the preferred embodiment may include heat transfer circulating means 12 in rotor 16 to further facilitate the removal of shear generated heat. Rotor 16 is adapted to be driven through suitable motor and gearing means well known and not shown.

A hopper 22 disposed on body 12 communicates with bore 14 through a feed opening 24. Material deposited in hopper 22 and falling into bore 14 is advanced by rotor 16 longitudinally through bore 14 to an extruder head 26 which generally includes discharge opening 28 to discharge material to receiving apparatus of a process line (not shown).

Mixing extruder 10 may be understood in greater detail by reference to individual sections of the body 12 and rotor 16 which include feed section 40, pumping section 50, mixing section 60 and discharge section 70 and the discussion which follows. Feed section 40 includes generally that portion of the body and rotor which extend from the rearmost portion of the hopper 22 and hopper opening 24 to a point in said bore substantially forward of the feed hopper 22. Rotor 16 is adapted with one or more primary flights 18 which spiral coextensively with the rotor through feed section 40 of the body 12. The rotor 16 and flight 18 have a general function to receive material placed in the feed hopper 22 such as molten or semimolten thermoplastic material (e.g. polyethylene) and convey it forwardly into the pumping and mixing sections of the extruder. The material to be advanced is trapped in channel 19 (defined by adjacent convolutions of flight 18) and conveyed forwardly by the rotary motion of rotor 16 within bore 14. Rotor 16 in feed section 40 is similar to conventional extruder screws and known feed sections. As illustrated, rotor 16 may include a compression section 42 which may compress and force the material to be extruded forwardly toward the discharge end 26. In the illustrated embodiment, the diameter of rotor 16 increases, causing the volume within channel 19 to reduce in the direction of the advancing material, thereby causing the material therein to be compressed and forced forwardly under pressure into the extruder 10.

Forwardly of feed section 40, extruder 10, including main body portion 12 and rotor 16, is divided into a plurality of alternating functional sections, being pumping sections 50 and mixing sections 60. In the illustrated embodiment three such combinations of pumping sections 50 and mixing sections 60 are illustrated; however, within the scope of the invention the numbers and extent of each of the particular sections may be varied to meet the requirements to the particular worked materials as hereafter explained.

In the pumping section 50 rotor 16 is adapted with a plurality of flights 51 of generally uniform pitch extending throughout the section. In the illustrated embodiment, rotor 16 is quadruple flighted with alternate ones of the flights 51 being continuations of flights 18 of feed section 40. Flights 51 closely fit bore 14 with a minimum clearance such that during rotation of rotor 16 the flights closely wipe the bore walls to remove the maximum amount possible (consistent with extruder design practice) of the thin layer of cooled, viscous plastic adhering to the bore wall. Flights 51 receive material from feed section 40 and convey it through the pumping section to mixing section 60 under pressure sufficient to force the material through that section to the subsequent pumping section. In section 50, the angle of helix of flight 51 is consistent with that known for primarily advancing material in an extruder. In the illustrated embodiment for low density polyethylene, a value of about 15° to 20° is used.

In mixing section 60 rotor 16 is adapted with a plurality of helical flights being primary flights 61 and secondary flights 62, the latter being disposed between adjacent primary flights. The channels formed between primary flight 61 and adjacent secondary flight 62, opposite the direction of rotation of rotor 16, is designated a primary channel 63. Likewise, the channel formed between secondary flight 62 and the following primary flight or next subsequent primary flight, opposite the direction of rotation, is designated a secondary channel 64. In the illustrated embodiment, the primary and secondary flights 61 and 62 are generally of equal helical pitch, however, of different pitch than the helical flights 51 in pumping section 50.

The pumping action of section 50 forces material into primary channel 63 between flights 61 and 62. Secondary flight 62 is in spaced relation to bore 14 to permit the material from primary channel 63 to escape therefrom and exit into secondary channel 64 by flowing over the periphery of secondary flight 62 as it is forced along channel 63 by subsequent material being pumped into channel 63 by the preceding section 50. The spacing of secondary flight 62 from bore 14 may be preselected for the particular classes of materials being extruded or worked by the extruder 10 so as to exert a high shear on the material at such time as it passes from primary channel 63 over secondary flight 62 into secondary channel 64. Primary channel 63 is adapted to receive the thermoplastic material from pumping section 50 and to cause the material to exit that channel over flight 62 into secondary channel 64 by the structure subsequently described. Primary flights 61 closely approach the bore 14 causing material to be captured by the primary flight and advanced in secondary channel 64 by the rotation of rotor 16.

In section 60 the angle of helix of said primary and secondary flights 61, 62 is consistent with that known for causing material to be extruded over the top of said secondary flight 62 (generally imparting less forward thrust on said material than pumping flight 51), e.g., 30°.

Figure 2:
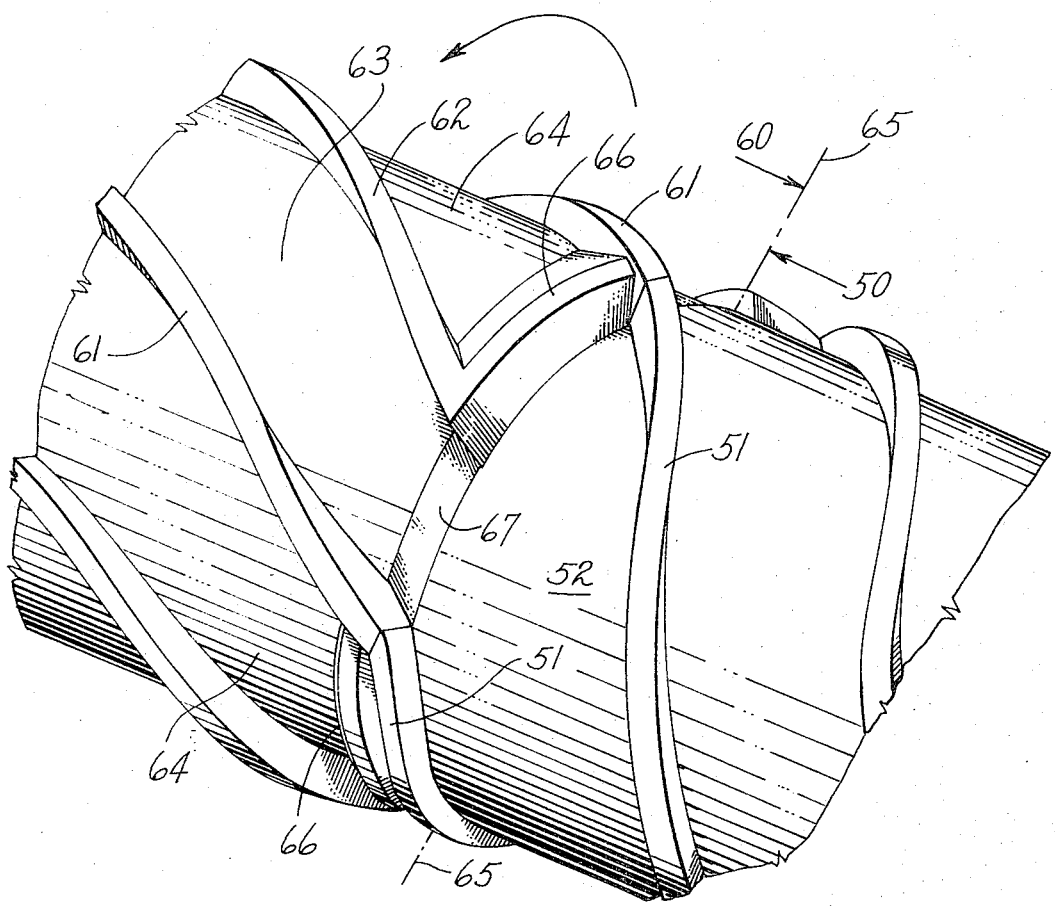
FIG. 2 is a partial pictorial view of a section of the rotor of the extruder of FIG. 1.
Figure 4:
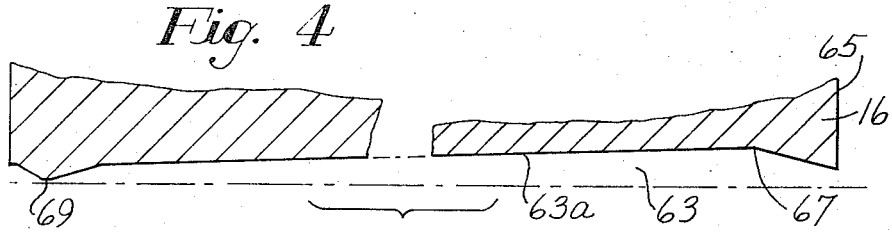
FIG. 4 is a partial sectional view of a primary channel in a mixing section of the rotor of the extruder illustrated in FIG. 1.
Figure 5:
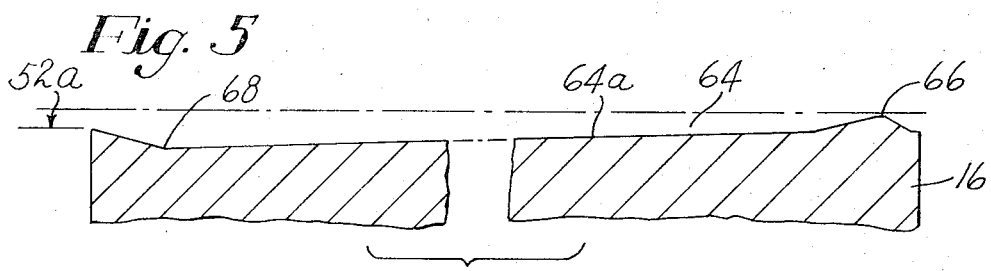
FIG. 5 is a partial sectional view of a secondary channel in a mixing section of the rotor of the extruder illustrated in FIG. 1.

Referring now to FIGS. 2, 4 and 5, it may be seen that pumping section 50 transitions into mixing section 60 along line 65. In this region channel 52 formed by adjacent flights 51 within pumping section 50 empties into primary channel 63 defined by primary flights 61 and secondary flights 62. In the region of line 65 in FIG. 4 the secondary channel 64 is isolated from channel 52 by gate 66 which extends between secondary flight 62 and primary flight 61. To insure that primary channel 63 is capable of receiving all of the material being advanced in channel 52, channel 63 may be adapted to exhibit a larger volume as by deepening the channel (as indicated at 67).

Within mixing section 60 the thermoplastic material advanced into primary channel 63 from channel 52 is required by the subsequently described structure to be subjected to a high shear action by being worked over the periphery of secondary flight 62. This forced exiting of material from primary channel 63 over flight 62 into secondary channel 64 is accomplished by causing the cross-sectional area or volume or primary channel 63 to diminish in a forwardly direction along the rotor 16. As can be seen from FIG. 4 floor 63a of primary channel 63 rises uniformly from its deepest point at 67 to a gate 69 at the forward end of the mixing section. Where the primary channel 63 terminates in the illustrated embodiment, the land portion of gate 69 is in a spaced relation to bore 14 substantially equal to that of secondary flight 62. By such relationship, the material exiting the primary channel 63 is subjected to approximately the same shear action whether it is sheared over gate 69 or secondary flight 62.

Figure 3:
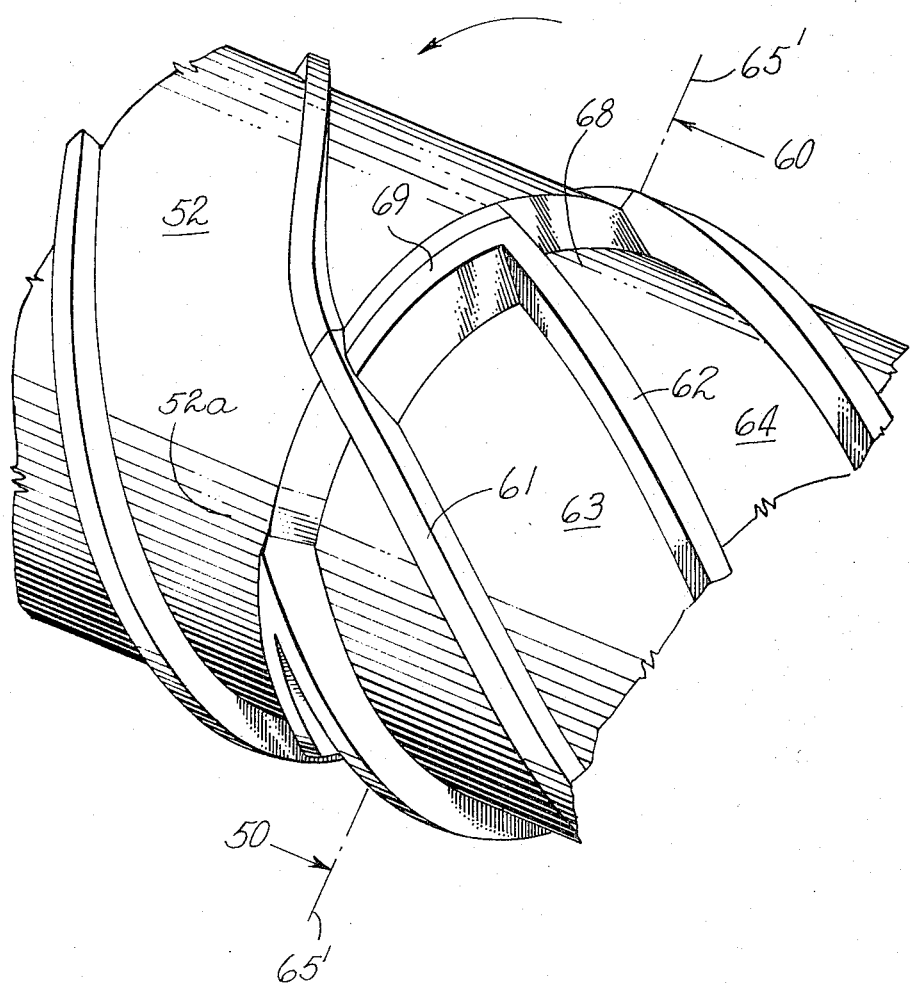
FIG. 3 is a partial pictorial view of a different section of the rotor of the extruder of FIG. 1.

Referring now to FIGS. 3 and 5, it may be seen that the floor 64a of secondary channel 64 slopes radially inwardly with respect to the axis of rotor 16, thereby enlarging the volume or unit cross-sectional area of secondary channel 64 (as viewed in a forwardly direction consistent with material movement within the mixing section). Channel 64 reaches its maximum volume at 68, which location is substantially opposite gate 69 in primary channel 63. In the illustrated embodiment, primary channel 63 and secondary channel 64 are reverse images of each other, thereby insuring that the flow of material over the periphery of secondary flight 62 is substantially uniform along the flight's length throughout the section 60 (as from line 65 to line 65') and that the volume of material received in channel 63 from channel 52 may also be accepted within channel 64 after being sheared over secondary flight 62. At the exit end of mixing section 60, the floor 64a of secondary channel slopes up to meet the floor 52a of the channel 52 in the next successive pumping section 50.

In the illustrated embodiment, extruder 10 includes a plurality of alternating pumping and mixing sections (three pairs) disposed between the feed section 40 and discharge section 70. In the illustrated embodiment, the discharge section 70 may be similar to pumping section 50 sufficient in length to extrude the thermoplastic material through discharge means 26.

In operation, material to be homogenized such as a polyethylene may be fed to extruder 10 by being deposited in hopper 22 from means such as a polymer reactor (not shown). Flow of polymer to the rotor 16 may be regulated as by valving means 26 well known in the art. Regulation of the degree of the flow of polymer to rotor 16 may be employed to accomplish control over the filling of channel 19. It is known that the pumping characteristics of a screw (rotor 16 and flight 18) will vary with the amount of screw filling or channel filling. It is also known that the mechanical energy required to turn an extruder screw and hence the work energy input to the material is substantially directly proportional to the screw speed. Thus, for a given material, by coordinately controlling the rotational speed of rotor 16 and the filling of channel 19, the specific work input to the material or polymer may be controlled independent of production rate of the extruder.

In the illustrated embodiment, the rotor 16 in the feed section 40 is double flighted (two independent thread convolutions 18 regularly spaced helically around rotor 16). The feed section 40 of the illustrated embodiment is similar in function to conventional extruder screws in that it has the traditional feed, transferring and pumping zones which compress and force the material (polymer) forwardly. After several turns of the screw in the first pumping section 50, a quadruple flight (four independent thread convolutions) is started on that screw by means of the multiple primary flights of 51. The multiple flights 51 on the metering section enhance the heat removal of polymer from within the polymer to the barrel 14. It is known that the principal barrier to heat transfer in molten polymer to an extruder wall is the thin layer of cooled or frozen plastic adhering to a barrel or bore wall. The thickness of this polymer film and hence its resistance to the heat flow varies directly with the clearance between the flight and the double wall and inversely with the frequency of flights passing over a given spot on the barrel or bore. In the illustrated embodiment, the quadruple flighted section insures a frequent scraping of the bore 14 and thus minimization of the film of polymer between bore 14 and flight 51 which, in turn, minimizes the restriction of heat flow between the polymer within channel 52 and the bore 14. It should be noted that though double and quadruple flights have been selected in feed section 40 and in pumping section 50 other multiple flight arrangements may be used as a matter of design choice and do not depart from the scope of the present invention.

After the initial pumping section 50 several alternate mixing and pumping sections 60 and 50 respectively are alternately spaced along the rotor. Again, three of such alternative sections are illustrated; however, the number of these elements may vary depending upon the specific work input desired upon particular material to be worked. For different materials I have used as few as one pair and as many as eight pairs to effect the specific work input desired for particular extruded materials.

As material is captured by channel 19 between adjacent flights 18 within the feed section 40 it is in turn fed to the quadruple flights 51 of initial pumping section 50. Section 50 thus compresses the material forwardly into first mixing section 60 therein. The material in channels 52 is thus pumped into the receiving channels or primary channels 63 of mixing section 60. As previously described, the depth of primary channels 63 varies from their deepest on the infeed side to their shallowest at the forwardmost extent thereof. Conversely, secondary channels are shallowest on the infeed side and in the preferred embodiment blocked from channels 52 by gates at 66. Secondary channels progressively deepen toward their forwardmost extent correspondingly with the shallowing of primary channels 61. This continuously changing depth of primary and secondary channels (63, 64 respectively) provides a further benefit to mixing not previously discussed. Shear rate on extruded material is conventionally approximated as the peripheral velocity of the root of an extruder screw divided by the channel depth. In the illustrated invention, the channel depth of the primary channel continuously varies (ranging from a maximum value at the origin of the mixing section to a minimum value at the end of that section), throughout the length of a particular section. While it may be said that the change in channel depth also affects the radius of the root of the extruder screw, it should be recognized that this radial change is truly nominal when compared to the overall radius (such as ¼ to ½ inch in a 13 inch screw). The effect of a continually changing shear rate on the material undergoing shear is to enhance the distributive mixing of additives to the material being processed within the extruder. This is to say, there is a greater blending in of added ingredients. With the particular arrangement of primary and secondary channels chosen the material may flow into the four primary channels 61 in a generally unrestricted manner from channels 52. As the material advances in channel 61, the unit volume decreases substantially uniformly along the channel, gradually forcing the material from primary channels 61 over the secondary flights 62 into the secondary channels 64. The primary flights 61 closely wipe bore 14 to contain substantially all of the material sheared into the secondary channels therein. The clearance between the secondary flight 62 and bore 14 is considerably greater than that of the primary flight 61; thus the material as it is gradually forced out of channel 61 is sheared over flight 62 and is captured in channel 64. While being forced over secondary flight 62 the material or polymer is subjected to an intensive shearing action, which enhances the physical properties of the material. The material also experiences a pressure drop in flowing over secondary flight 62 and being captured within channel 64 so that upon discharge from secondary channel 64 (and thus from mixing section 60) the material must again be repressurized to force it through subsequent mixing sections or through discharge at 26. As may be seen, primary channel 63 contains a gate at 69 at its forwardmost extent thereof restricting the flow of material from the primary channel to either the secondary channel 64 or over the top of the gate 69 to the subsequent channel 52 of a successive metering or discharge section. By such means material received within primary channel 63 may not exit that channel without being subjected to an intensive shear action as by being caused to flow over the secondary shear flight 62.

It is well known that this subjecting of plastic materials to intensive high shear actions generates a substantial amount of heat within the material being sheared. As with many such plastic materials, low density polyethylene is susceptible to degradation when subjected to elevated temperatures over prolonged periods of time. Thus successive pumping sections effect an intermediate cooling of the polymer prior to its being again subjected to the high shear of a further mixing section. As the sheared material exits a mixing section 60, as by flowing from a secondary channel 64 into a successive pumping section channel 52, the material is captured within that section and advanced forwardly along the section. The material is thus pressurized in pumping section 50 to carry it through the next subsequent section.

Heat transfer means 13, 15 and 17 in conjunction with the minimizing of the film buildup of cooled polymer along the bore 14 by multiple flights 51 together enhance the removal of heat from the sheared polymer. This reduction of its temperature enables it to be again subjected to further homogenization or mixing action by a subsequent mixing section 60. Depending upon the particular requirements of the material, and the need of repeated heat removal therefrom, the length and number of pumping and mixing sections are adjusted to accommodate the particular material. As previously, these sections may number from pairs of one to pairs of eight or more and typically the length to diameter ratio of the extruder may vary between anywhere from 16 to 1 to 40 to 1. In the preferred arrangement for processing low density polyethylene, it is expected that the general ratio be in a range of 24 : 1 to 32 : 1.

Finally, after the processed polymer has been subjected to the action of the various pairs of mixing and pumping sections, it is advanced to the discharge section 70 wherein it is pressurized and cooled for final discharge from the extruder as through discharge means 26. Conventionally, polymer is supplied to an underwater pelletizer or other known means to process the material for either storage or further processing as by production into film or the like.

Having thus described an illustrative embodiment of my invention, it should be appreciated that modifications may be made which are within the scope of the invention as defined by the appended claims.

I claim:

1. An extruder for the processing of thermoplastic material comprising: a body having a bore extending generally longitudinally therethrough, having a feed opening for the introduction of material to be processed, said opening being disposed in said body generally at one end of said bore, and having a discharge opening generally at the opposite end of said bore; and a rotor disposed in said bore for rotary movement therein defining a feed section, a mixing section and a discharge section; means for rotating said rotor; a first helical thread convolution disposed on said rotor forming a primary flight extending substantially continuously throughout said feed, mixing and discharge sections, said adjacent convolutions of said thread forming a channel therebetween for conveying said material; a second helical thread convolution disposed on said rotor forming a secondary flight extending substantially coextensively with said primary flight and in said channel between said primary flights forming two adjacent channels between said adjacent primary flights, said first of said channels being that channel between said primary flight and said secondary flight in the direction opposite rotation being denoted a primary channel and the second of said two channels being that channel between said secondary flight and said next adjacent primary flight in the direction opposite rotation being denoted a secondary channel; said primary channel including a dam disposed therein at the exit end of said mixing section, said secondary channel including a dam disposed therein at the entrance end of said mixing section whereby material traversing said mixing section is controlled to enter said section via said primary channel and exit said section via said secondary channel after having been extruded over said secondary flight.

2. An extruder according to claim 1 wherein said primary channel has an initial unit volume greater than said secondary channel.

3. An extruder according to claim 2 wherein said primary channel has a unit volume which progressively diminishes from said entrance end toward said exit end.

4. An extruder according to claim 3 wherein said secondary channel has a unit volume which progressively increases from said entrance end of said mixing section toward said exit end.

5. An extruder according to claim 4 wherein said primary and secondary flights are substantially parallel throughout said mixing section.

6. An extruder according to claim 5 wherein the sum of unit volumes of said primary and secondary channels taken at similar relative positions along said mixing section remain substantially constant.

7. An extruder according to claim 6 wherein said sum of said unit volumes is at least as large as the unit volume of said channel in said feed section.

8. An extruder according to claim 1 including a plurality of mixing sections alternately disposed on said rotor with pumping sections having a helical thread convolution thereon for assisting the advance of said material through said extruder.

* * * * *

… (5/69)

UNITED STATES PATENT OFFICE
CERTIFICATE OF CORRECTION

Patent No. 3,850,414      Dated November 26, 1974

Inventor(s) Hans R. Scharer

It is certified that error appears in the above-identified patent and that said Letters Patent are hereby corrected as shown below:

On the title page, (73) Assignee:, insert:

--USM Corporation, Boston, Massachusetts--

Signed and sealed this 4th day of February 1975.

(SEAL)
Attest:

McCOY M. GIBSON JR.
Attesting Officer

C. MARSHALL DANN
Commissioner of Patents

Disclaimer 3,850,414.—*Hans R. Scharer*, Wallingford, Conn. HOMOGENIZING EXTRUDERS. Patent dated Nov. 26, 1974. Disclaimer filed Sept. 15, 1975, by the assignee, *USM Corporation*.

Hereby enters this disclaimer to claims 1–8 of said patent.

[*Official Gazette December 16, 1975.*]